(12) United States Patent
Zhang et al.

(10) Patent No.: US 8,427,440 B2
(45) Date of Patent: Apr. 23, 2013

(54) CONTACT GROUPING AND GESTURE RECOGNITION FOR SURFACE COMPUTING

(75) Inventors: Kuo Zhang, Beijing (CN); Xueqing Sun, Beijing (CN); Guanggen Zhang, Beijing (CN); KeCheng Huang, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 685 days.

(21) Appl. No.: 12/435,419

(22) Filed: May 5, 2009

(65) Prior Publication Data

US 2010/0283739 A1 Nov. 11, 2010

(51) Int. Cl.
*G06F 3/041* (2006.01)
*G06F 3/033* (2006.01)

(52) U.S. Cl.
USPC .......................................... 345/173; 715/863

(58) Field of Classification Search .......... 345/173–178; 715/863
See application file for complete search history.

(56) References Cited

U.S. PATENT DOCUMENTS

| 7,339,580 | B2 | 3/2008 | Westerman et al. | |
|---|---|---|---|---|
| 7,479,949 | B2 | 1/2009 | Jobs et al. | |
| 2005/0104867 | A1* | 5/2005 | Westerman et al. | 345/173 |
| 2007/0103452 | A1* | 5/2007 | Wakai et al. | 345/173 |
| 2007/0152966 | A1 | 7/2007 | Krah et al. | |
| 2008/0165141 | A1 | 7/2008 | Christie | |
| 2008/0231610 | A1 | 9/2008 | Hotelling et al. | |

OTHER PUBLICATIONS

Ziberg Christian , "Apple Submits Voice, Finger, Gaze and Facial Recognition Patent Application", Retrieved at<<http://www.tgdaily.com/content/view/39190/118/>>, Sep. 4, 2008, pp. 1-3.
Rao Prashant, "Multi-Touch Computing Comes of Age", Retrieved at<<http://www.expresscomputeronline.com/20081117/edit01.shtml>>, pp. 2.
Morris, et al."Cooperative Gestures: Multi-User Gestural Interactions for Co-Located Groupware", Retrieved at<<http://research.microsoft.com/en-us/um/people/merrie/papers/coopgest.pdf>>, CHI 2006, Apr. 22-28, 2006, Montréal, Québec, Canada, ACM , 2006, pp. 10.
Moscovich, et al."Multi-Finger Cursor Techniques", Retrieved at<<http://www.moscovich.net/tomer/papers/multifcursors-gi2006.pdf<<, pp. 7.
"Renci Vis Group Multi-Touch Blog", Retrieved at<<http://vis.renci.org/multitouch/>>, RENCI @ SC08 Video, Dec. 12, 2008, exhibit at Supercomputing 08 in Austin, TX on Nov. 17-20, pp. 1-12.

(Continued)

*Primary Examiner* — Alexander S Beck
*Assistant Examiner* — Tony N Ngo
(74) *Attorney, Agent, or Firm* — Hope Baldauff Hartman, LLC

(57) ABSTRACT

Tools and techniques for contact grouping and gesture recognition for surface computing are provided. These tools receive, from a finger grouping subsystem, data representing velocity parameters associated with contact points, with the contact points representing physical actions taken by users in interacting with software applications presented on a surface computing system. These tools also identify gestures corresponding to the physical actions by analyzing the velocity parameters, and provide indications of the identified gestures to the software applications.

20 Claims, 6 Drawing Sheets

OTHER PUBLICATIONS

"Apple Details Next-Gen Multi-Touch Techniques for Tablet Macs", Retrieved at<<http://forums.techarena.in/portable-devices/1028968.htm>>, pp. 5.

Rao Prashant, "Multi-Touch Computing Comes of Age", Nov. 17, 2008, Retrieved at<<http://www.expresscomputeronline.com/20081117IeditD1.shtml>>, pp. 2.

Moscovich, et al. "Multi-Finger Cursor Techniques", 2006, Proceedings of Graphics Interface (GI '06), Retrieved at<<http://www.moscovich.net/tomer/papers/multifcursors-gi2006.pdf>>, pp. 7.

"Apple Details Next-Gen Multi-Touch Techniques for Tablet Macs", Aug. 29, 2008, Retrieved at<<http://forums.techarena.in/portable-devices/1 028968.htm>>, pp. 5.

\* cited by examiner

CONTACT GROUPING AND GESTURE RECOGNITION FOR SURFACE COMPUTING

BACKGROUND

Surface computing systems enable users to interact with software applications by physical actions, rather than by issuing commands through a point-and-click menu hierarchy, or by speaking or typing commands. However, recognizing physical actions and correlating them correctly to commands intended by the users remains an ongoing challenge. Another challenge is reducing the impact of jitter inadvertently introduced into the physical actions by users.

SUMMARY

Tools and techniques for contact grouping and gesture recognition for surface computing are provided. These tools receive, from a finger grouping subsystem, data representing velocity parameters associated with contact points, with the contact points representing physical actions taken by users in interacting with software applications presented on a surface computing system. These tools also identify gestures corresponding to the physical actions by analyzing the velocity parameters, and provide indications of the identified gestures to the software applications.

It should be appreciated that the above-described subject matter may be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
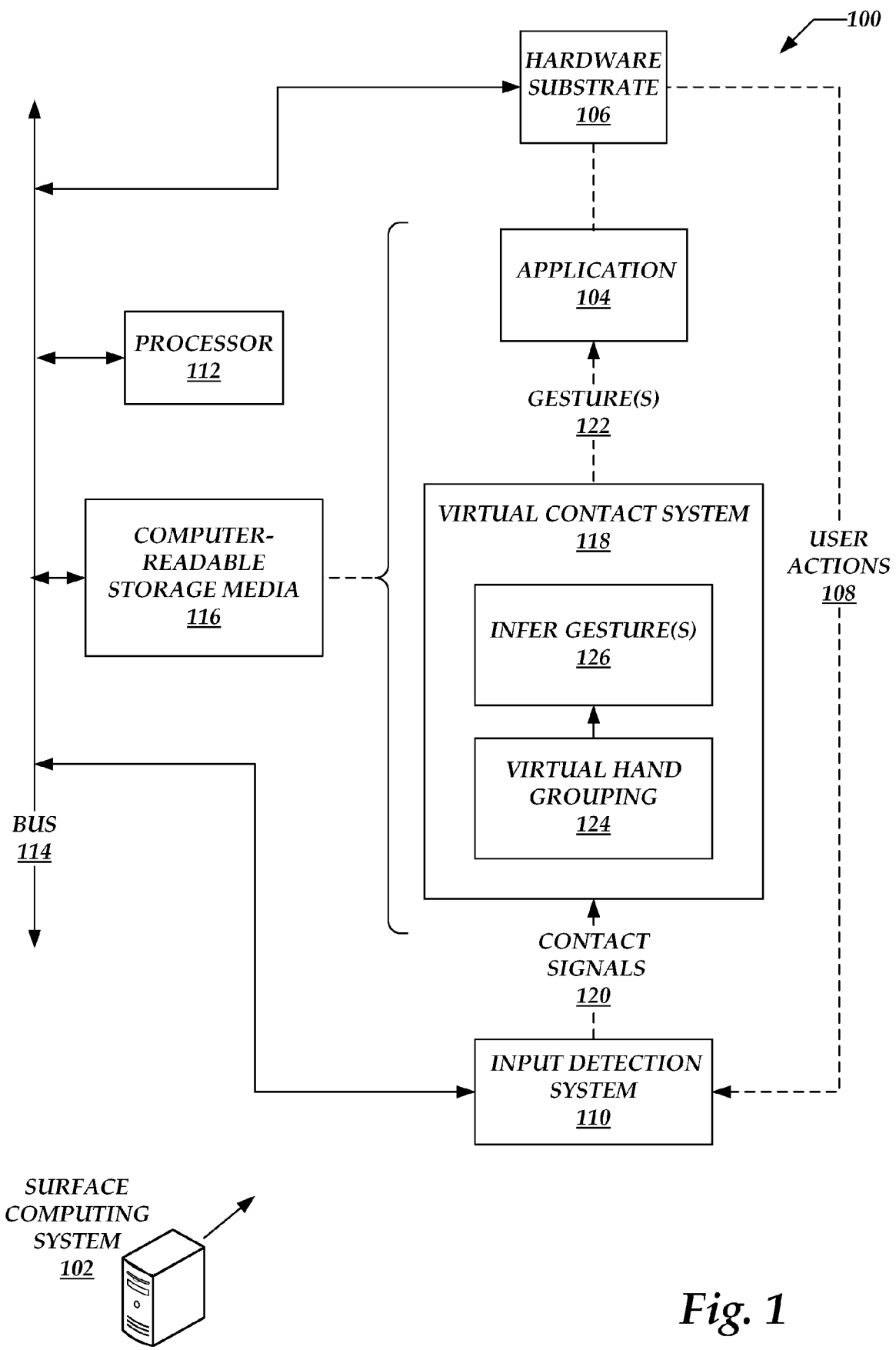
FIG. 1 is a block diagram illustrating systems or operating environments suitable for contact grouping and gesture recognition for surface computing.

The following detailed description provides tools and techniques for contact grouping and gesture recognition for surface computing. While the subject matter described herein presents a general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The following detailed description refers to the accompanying drawings that form a part hereof, and that show, by way of illustration, specific example implementations. Referring now to the drawings, in which like numerals represent like elements through the several figures, this description provides various tools and techniques related to contact grouping and gesture recognition for surface computing.

FIG. 1 illustrates systems or operating environments, denoted generally at 100, related to contact grouping and gesture recognition for surface computing. Turning to FIG. 1 in more detail, these systems 100 may include any number of surface computing systems 102, with FIG. 1 illustrating one surface computing system 102 only for clarity of illustration.

Examples of the surface computing systems 102 may include any processor-based computing systems that enable users to interact with software applications 104 via physical actions. Examples of the software applications 104 may include, are not limited to, digital mapping applications, navigation applications, image or photo viewing or editing applications, and the like. In cases where the software applications 104 include navigation or mapping applications, the software applications 104 may present visual representations of a given geographic region onto the hardware substrate 106. In turn, the users may issue commands to the software applications 104 by directing particular physical actions to the hardware substrate 106. FIG. 1 generally denotes these physical actions at 108. Without limiting possible implementations, and only to facilitate the present description, this discussion uses the term "gestures" to refer to physical actions that correspond to predefined commands recognized by the software applications 104.

Examples of gestures recognized by the software applications 104 may include, but are not limited to, commands such as pan, zoom, rotate, and the like. Users may perform these gestures to using one hand or both hands, and may also use any number of fingers on either or both hands. For example, wherein the software application 104 includes a mapping or navigation application, the mapping or navigation application may present an image on the hardware substrate 106. The user may manipulate this image by, for example, placing one hand on the hardware substrate 106 in moving a thumb and at least one other finger closer together or farther apart. Depending on particular implementations of the software applications 104, this type of gesture may be interpreted as a zoom-in or a zoom-out command. Users may accomplish similar functions by placing two hands upon the hardware substrate 106, and moving those two hands closer together or farther apart.

Users may issue commands to pan the image in any direction by placing one or both hands on the hardware substrate 106, and sliding one or both hands in the desired direction along the hardware substrate 106. Regarding rotate commands, users may rotate the image by placing one or both hands on the hardware substrate 106. In some cases, users may place one hand on the hardware substrate 106. In such cases, the users may issue a rotate command by rotating that hand on the hardware substrate 106. For example, a user may leave his or her thumb relatively stationary on the hardware substrate 106, and then rotate one or more fingers around the thumb, with the thumb serving as a type of pivot point.

In other cases, users may place both hands on the hardware substrate 106. In such cases, the users may issue rotate commands by leaving one hand relatively stationary on the hardware substrate 106, and then rotating one or more fingers on the other hand relative to the stationary hand.

Users may also perform gestures to invoke particular functions provided by the software applications 104. For example, the software applications 104 may interpret a question mark drawn by a user on the hardware substrate 106 as a command to invoke help utilities provided by the software applications 104. As with the example commands described above, users may draw question marks or other symbols using one or both hands.

In light of the previous description, the user actions 108 may include, but are not limited to, the foregoing actions associated with the above examples of commands. The surface computing systems 102 may detect and recognize the user actions 108 using any number of different technologies. For example, the hardware substrate 106 may provide a touch-sensitive surface, operative to output electrical signals indicating where and how a given user has physically interacted with the hardware substrate 106. In other examples, the hardware substrate 106, or other hardware within the surface computing system 102, may incorporate one or more cameras that are operative to capture representations of physical interactions with users. These cameras may be combined with image or video processing technology, adapted as appropriate to process these representations of the user actions 108, to determine where and how a given user has "touched" the hardware substrate 106. However, the foregoing examples are provided only for the sake of illustration, and implementations of this description may include other technologies for the detecting and processing the user actions 108 without departing from the scope and spirit of this description.

In general, FIG. 1 represents at 110 any hardware and/or software involved with detecting and processing the user actions 108. It is understood that implementations of an input detection system 110 may include, but are not limited to, any of the foregoing technologies for detecting occurrences of the user actions 108.

Turning to the surface computing systems 102 in more detail, these systems may include one or more instances of processing hardware, with FIG. 1 providing a processor 112 as an example of such processing hardware. The processors 112 may have a particular type or architecture, chosen as appropriate for particular implementations. In addition, the processors 112 may couple to one or more bus systems 114, having type and/or architecture that is chosen for compatibility with the processors 112.

The surface computing systems 102 may also include one or more instances of hardware substrates 106, coupled to communicate with the bus systems 114. In addition, the input detection systems 110 may also couple to communicate with the bus systems 114. Accordingly, in some implementations of this description, signals representing the user actions 108, as directed to the hardware substrate 106, may travel along the bus systems 114 to be detected and processed by the input detection system 110. In other implementations, the hardware substrate 106 may be integrated with the input detection system 110, and may communicate with other components using a single interface to the bus system 114.

The surface computing systems 102 may include one or more instances of a physical computer-readable storage medium or media 116, which couple to the bus systems 114. The bus systems 114 may enable the processors 112 to read code and/or data to/from the computer-readable storage media 116. The media 116 may represent apparatus in the form of storage elements that are implemented using any suitable technology, including but not limited to semiconductors, magnetic materials, optics, or the like. The media 116 may represent memory components, whether characterized as RAM, ROM, flash, solid-state hard drive, or other types of technology.

The storage media 116 may include one or more modules of software instructions that, when loaded into the processor 112 and executed, cause the surface computing systems 102 to perform contact grouping and gesture recognition for surface computing. As detailed throughout this description, these modules of instructions may also provide various tools or techniques by which the surface computing systems 102 may participate within the overall systems or operating environments 100 using the components, message and command flows, and data structures discussed in more detail throughout this description. For example, the storage media 116 may include one or more software modules that constitute the software applications 104.

The storage media 116 may also include software modules that provide a virtual contact system 118. In general, the virtual contact system 118 may operate by receiving contact signals 120 that represent raw contact inputs, as generated an output by the input detection system 110. These contact signals 120 may represent electrical signals that represent the user actions 108, as directed to the hardware substrate 106. More specifically, the contact signals 120 may indicate contact points at which users are touching or sliding one or more hands, and/or one or more fingers, along the hardware substrate 106. For example, if a given user is sliding all five fingers of both hands along the hardware substrate 106, the contact signals 120 may indicate ten (10) contact points, sliding from one set of locations to another along the hardware substrate 106 at particular velocities. If the given user is sliding one finger from both hands along the hardware substrate 106, the contact signals 120 may indicate two contact points. If the given user is sliding one finger from one hand along the hardware substrate 106, the contact signals 120 may indicate one contact point, and so on.

The contact signals 120 may be said to be "raw", in the sense that the signals themselves may not indicate which finger is associated with which contact signal, and may not indicate the hand with which different contact signals 120 are associated. However, the virtual contact system 118 may receive and process these contact signals 120, as described in further detail below, to identify particular gestures 122 indicated by the user actions 108.

Turning to the virtual contact system 118 in more detail, the virtual contact system 118 may include a subsystem 124 for grouping the contact signals 120 into virtualized representations of human hands. In the examples described herein, the subsystem 124 may group the contact signals 120 into virtual representations of two human hands. However, implementations of this description may vary from these examples, without departing from the scope and spirit of this description.

In turn, the subsystem 124 may forward these grouped signals to another subsystem 126, which is operative to infer the gestures 122 from these grouped signals. More specifically, as described below, the subsystem 126 may analyze characteristics of the virtual human hands to identify the gestures 122.

Having described the systems and overall operating environments 100, the discussion now turns to a more detailed description of the subsystem 124 for virtual hand grouping. This description is now provided with FIG. 2, and subsequent drawings.

Figure 2:
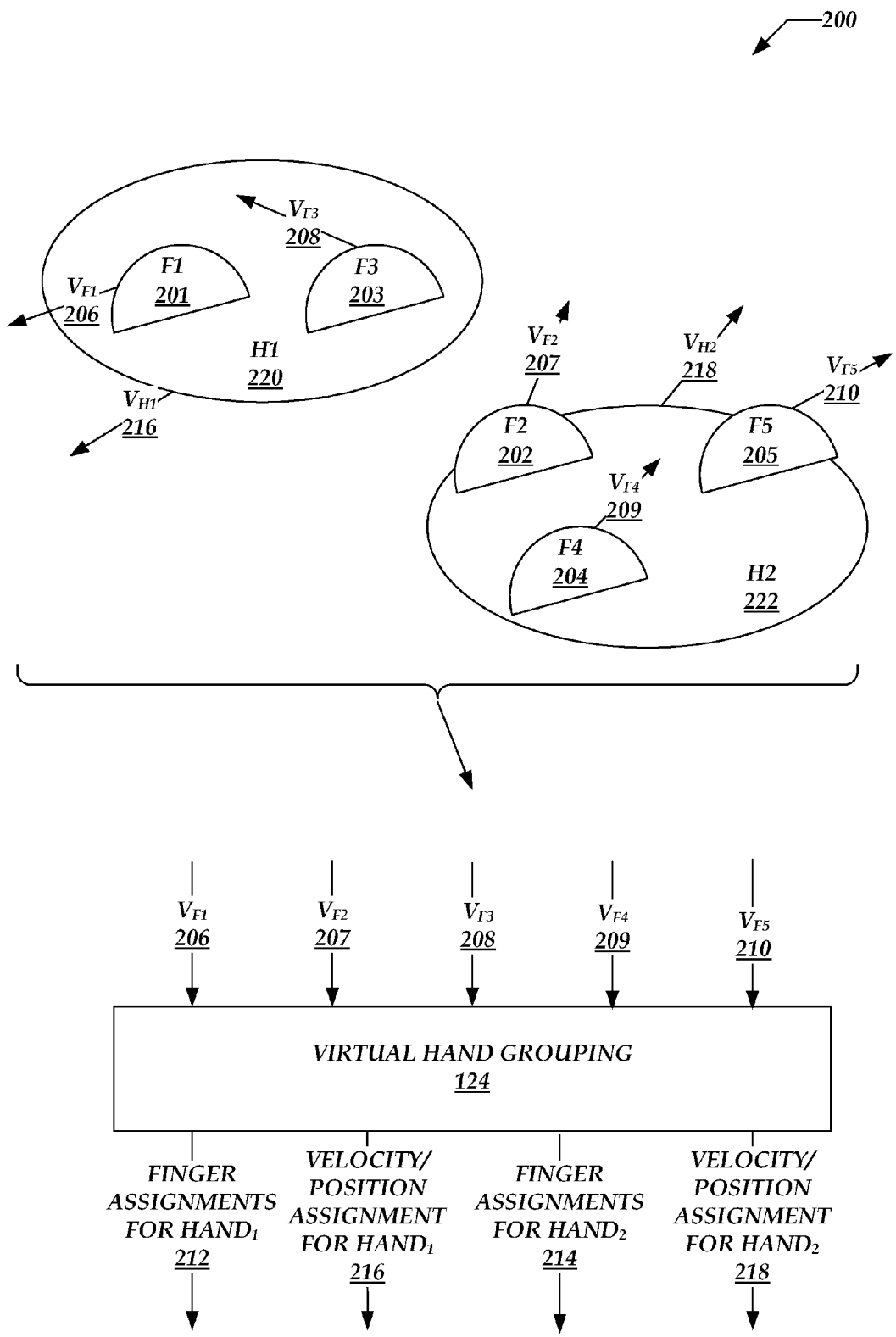
FIG. 2 is a schematic and block representation of user actions as directed to a hardware substrate provided by a surface computing system.

FIG. 2 illustrates examples, denoted generally at 200, of user actions 108 as directed to the hardware substrate 106. For clarity of illustration, FIG. 2 does not include representations of the user actions 108 and the hardware substrate 106. However, FIG. 2 illustrates five examples of contact points 201-205, which represent contact points associated with different fingers as the user actions 108 are performed along the hardware substrate 106.

Initially, the contact signals 120 as generated by the input detection system 110 may provide representations of the contact points 201-205. More specifically, the contact signals 120 may indicate position and velocity information associated with the different contact points 201-205. Velocity information may include representations of magnitude and direction that are associated with a given movement. The top of FIG. 2 denotes illustrative position information at 201-205, and denotes velocity information by the vectors 206-210. It is noted that the examples shown in FIG. 2 are not drawn to scale in terms of size or direction, and are provided only to facilitate the present description, but not to limit possible implementations of this description. In addition, FIG. 2 illustrates five contact points 201-205 only as examples. However, implications of this description may operate with any number of contact points.

Turning to the bottom portion of FIG. 2, the velocity vectors 206-210 represent five respective velocity parameters associated with the five contact points 201-205. In overview, the subsystem 124 for virtual hand grouping may receive signals representing these velocity vectors 206-210 for the five contact points 201-205, and may generate as output virtualized finger assignments, which may assign some the contact points 201-205 to a first virtual hand representation, in which may assign other contact points 201-205 to a second virtual hand representation. FIG. 2 represents finger assignments for a first virtual hand at 212, and represents finger assignments for a second virtual hand at 214. In the non-limiting examples shown at the top of FIG. 2, the contact points or fingers 201 and 203 are assigned to the virtual hand 212, and the contact points or fingers 202, 204, and 205 are assigned to the virtual hand 214.

In addition, the subsystem 124 for virtual hand grouping may assign positions and velocities for the virtual hands 212 and 214, as distinguished from individual positions and velocities of the various contact points 201-205 that are assigned to those virtual hands 212 and 214. FIG. 2 represents velocity assignments for the virtual hands at 216 and 218. Location assignments for the virtual hands are shown schematically at the top of FIG. 2 at 220 and 222.

In providing the foregoing description of FIG. 2, it is noted that the assignments represent schematically in FIG. 2 may be implemented within suitable data structures maintained by the subsystem 124 for virtual hand grouping. These data structures may be created and manipulated according to the process flows now described with FIG. 3.

Figure 3:
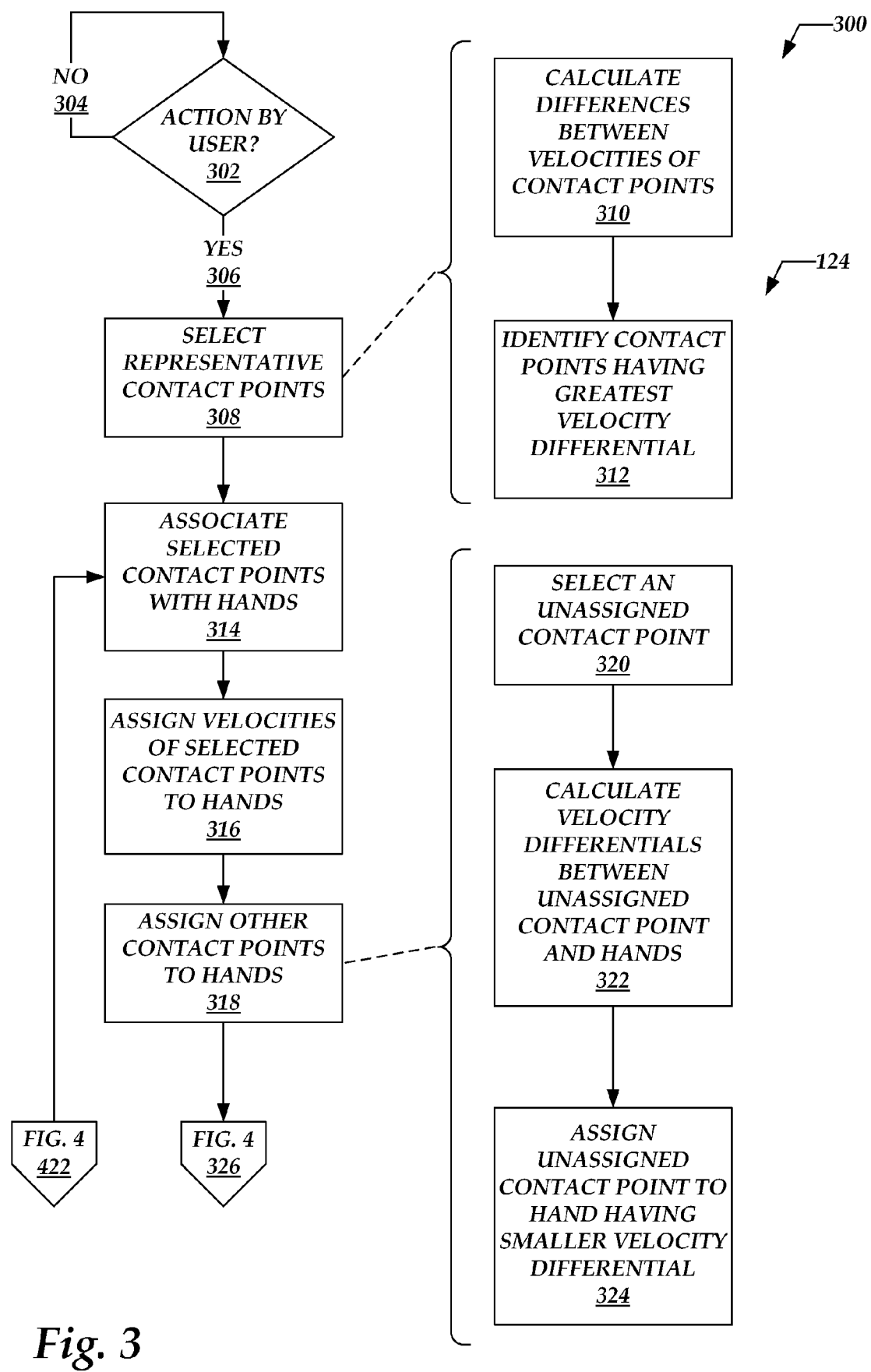
FIGS. 3 and 4 are flowcharts of processes for performing virtual hand grouping, as described in the foregoing examples.

FIG. 3 illustrates process flows, denoted generally at 300, for performing virtual hand grouping, as described in the foregoing examples. For ease of reference and description, but for limiting possible implementations, FIG. 3 is described in connection with the subsystem 124 for virtual hand grouping. However, implementations of this description may perform at least part of the process flows 300 with other components, without departing from the scope and spirit of the present description.

Turning to the process flows 300 in more detail, decision block 302 represents awaiting action by a given user as directed to a surface computing system (e.g., 102 in FIG. 1). FIG. 1 also provides examples of user actions at 108. The process flows 300 may take No branch 304 to loop at block 302, until user actions 108 are detected. Once the user actions 108 are detected, the process flows 300 may take Yes branch 306 to block 308. As described previously, the user actions 108 may be represented by any number of contact points (e.g., 201-205 in FIG. 2), which may in turn represent actions taken by different ones of the user's fingers.

Block 308 represents selecting representations of, for example, two fingers from among the contact points 201-205. The selection operations performed in block 308 may include calculating differentials in velocities between the various fingers as represented by the contact points 201-205, as represented at 310. For example, the fingers represented by the contact points 201, 202, 203, 204 and 205 may be traveling at the respective velocities $V_{F1}$, $V_{F2}$, $V_{F3}$, $V_{F4}$, and $V_{F5}$. The differential between the velocities $V_{F1}$ and $V_{F2}$ may be expressed as $V_{F2}-V_{F1}$, the differential between the velocities $V_{F1}$ and $V_{F3}$ may be expressed as $V_{F3}-V_{F1}$, and so on. Thus, block 310 may represent calculating velocity differentials for all pairs of contact points.

The operations represented in block 308 may also include identifying, for example, two fingers from those represented by the contact points 201-205. More specifically, block 312 represents identifying two fingers having the greatest velocity differential, as calculated above in block 310.

Block 314 represents associating the finger representations selected in block 308 with virtual hand representations. For example, block 314 may include defining two representations of virtual hands (e.g., 220 and 222 in FIG. 2), and associating or assigning one of the selected finger representations to one of the virtual hand representations, and assigning the other selected finger representation to the other virtual hand. For example, referring briefly back to the top of FIG. 2, assume that the fingers represented by the contact points 201 and 205 have the maximum velocity differential of any of the contact points 201-205. Thus, block 308 may include selecting those two contact points 201 and 205. In turn, block 314 may include associating the finger represented by the contact point 201 with the hand representation 220, and may include associating the finger represented by the contact point 205 with the hand representation 222.

Returning to FIG. 3, block 316 represents assigning position and velocity parameters to the virtual hand representations. More specifically, block 316 may include assigning the individual velocities of the contact points selected in block 308 to the virtual hand representations. Referring briefly back to the top of FIG. 2, block 316 may include assigning the velocity of the selected contact point 201 (i.e., $V_{F1}$) as the velocity 216 of the hand representation 220 (i.e., $V_{H1}$). Similarly, block 316 may include assigning the velocity of the selected contact point 205 (i.e., $V_{F5}$) as the velocity 218 of the hand representation 222 (i.e., $V_{H1}$).

Returning to FIG. 3, block 318 represents assigning the other or remainder of the contact points to the virtual hand representations. More specifically, the operations represented in block 318 may include selecting one of the unassigned contact points, as represented in block 320. For that selected unassigned contact point, block 322 represents calculating velocity differentials between that selected unassigned contact point and the different hand representations. Referring briefly back to the top of FIG. 2, assuming that block 320 selected the contact point 203, block 322 may include calculating differentials between the velocity (i.e., $V_{F3}$) of the selected contact point 203 and the assigned velocities (i.e., $V_{H1}$ and $V_{H2}$) of the different hand representations. Put differently, block 322 may include calculating $V_{F3}-V_{H1}$ and $V_{F3}-V_{H2}$.

Returning to FIG. 3, block 324 represents associating the selected contact point (e.g., 203 in the previous example) with the hand representation with which it has the smaller velocity differential. For example, if the selected contact point (e.g., 203) has a velocity value (i.e., $V_{F3}$) that is closer to the velocity value of the first hand representation (i.e., $V_{H1}$), then the selected contact point will be associated with the first hand representation.

Block 318 may be repeated for all remaining unassigned contact points (e.g., 201-205 in FIG. 2), assigning these contact points to the virtual hand representation with which they have the minimum velocity differential. As described above, FIG. 2 provides at 212 examples of finger assignments for a first virtual hand representation, and provides at 214 examples of finger assignments for a second virtual hand representation.

Figure 4:
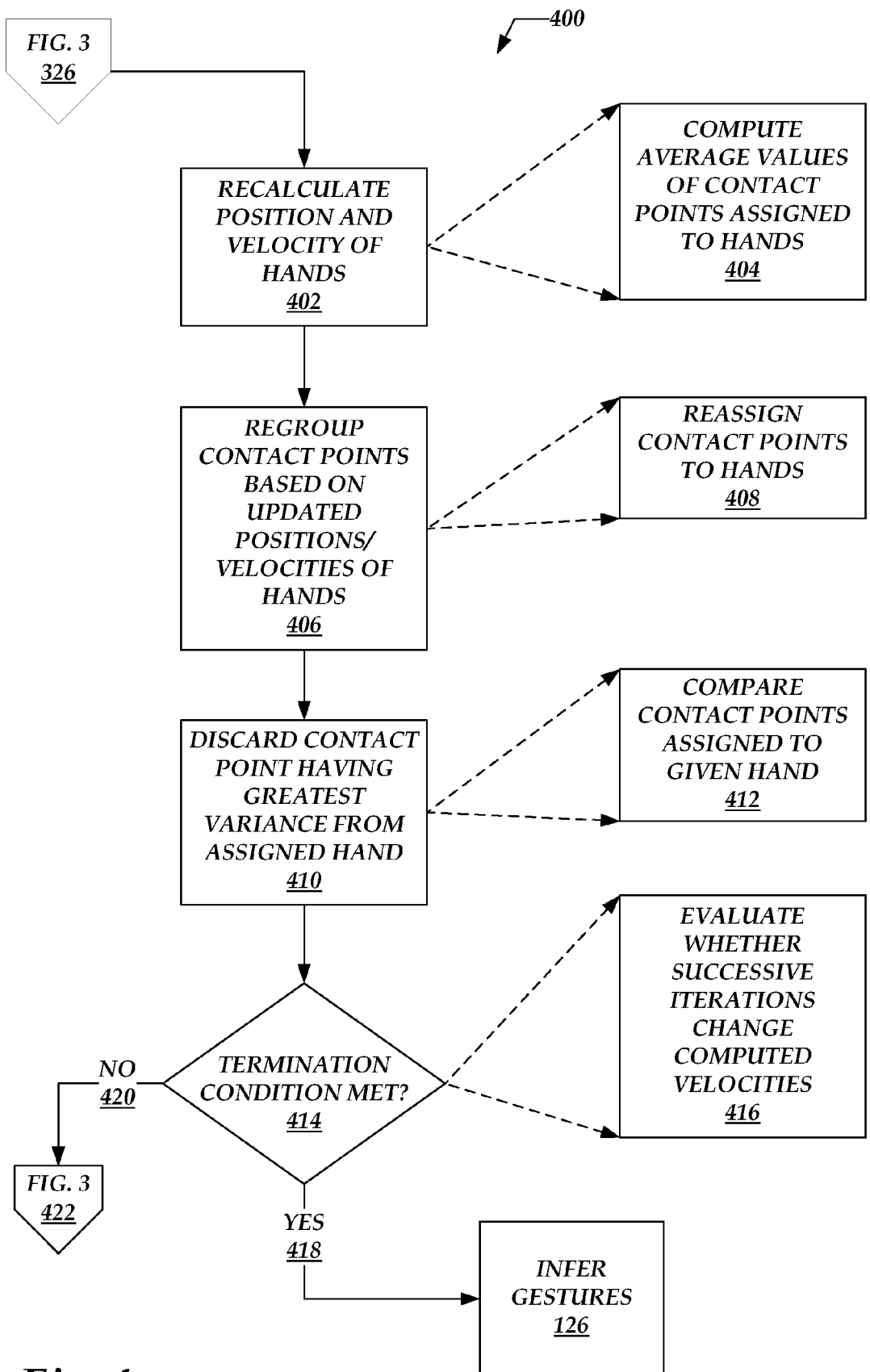

For convenience of illustration and description, but not to limit possible implementations of the process flows 300, the description of these process flows 300 continues to FIG. 4 via off-page reference 326.

FIG. 4 illustrates continuations, denoted generally at 400, of the process flows 300 described above with FIG. 3. Beginning at off-page reference 326, block 402 represents re-calculating the position and velocity values associated with the virtual hand representations. As described above, FIG. 2 provides at 216 examples of velocity ($V_{H1}$) and/or position assignments for a first virtual hand representation, and provides at 218 examples of velocity ($V_{H2}$) and/or position assignments for a second virtual hand representation.

As represented by block 404, block 402 may include calculating the position and/or velocity of the virtual hand representations by averaging the velocity and position values of the contact points that are assigned respectively to the virtual hand representations. Accordingly, the position and/or velocity values recalculated for the virtual hand representations in block 402 may incorporate the contact point assignments made in block 318 above.

Block 406 represents regrouping the contact points between the different virtual hand representations, based on the hand positions and/or velocities as recalculated in block 402. More specifically, block 406 may include reassigning contact points to the virtual hand representations, as represented in block 408. Block 408 may include calculating, for each contact point, the velocity differential between that contact point and the two virtual hand representations. Block 408 may also include assigning the different contact points to the virtual hand representation with which they have the smallest velocity differential. Similar processing is represented above in blocks 322 and 324.

Block 410 represents discarding, from each virtual hand representation, the contact point that has the greatest variance in position and/or velocity from the position and/or velocity assigned to that virtual hand representation. Block 410 may be repeated for each virtual hand representation defined at a given time. Block 410 may include comparing a given contact point within a virtual hand representation to the other contact points in that virtual hand representation, as represented at 412. In this manner, block 410 may exclude from the virtual hand representations those contact points that are "outliers" as compared to the other contact points. This exclusion may help eliminate jitter or other aberrations that may be detected within the user actions 108.

Block 414 represents evaluating whether a termination condition applicable to the process flows 300 and 400 has been met. Implementations of this description may incorporate any number of different suitable termination conditions. However, FIG. 4 illustrates at block 416 a non-limiting example of checking whether successive iterations of the process flows 300 and 400 change the velocities that are computed for the virtual hand representations. For example, if two successive iterations of the process flows 300 and 400 do not change the velocities computed for the virtual hand representations, in block 414 may determine that the process flows 300 and 400 have reached convergence, and that no further iterations are justified.

From decision block 414, if the termination condition has been met at a given iteration of the process flows 400, the process flows 400 may take Yes branch 418 to block 126. Block 126 is carried forward from FIG. 1 to represent inferring gestures from the user actions 108, based on the virtual hand representations established above ID process flows 300 and 400. More specifically, the virtual hand representations may be assigned a location parameter and a velocity parameter, based upon the contact points associated with those virtual hand representations. Processes for inferring gestures are described in further detail below with FIG. 5.

Returning to decision block 414, if the termination condition has not yet been met at a given iteration, the process flows 400 may take No branch 420 to return to the processes 300 in FIG. 3 via off-page reference 422. Referring briefly back to FIG. 3, processing may resume at block 314, where indicated by the off-page reference 422. When processing returns to block 314 via the off-page reference 422, block 314 may include initializing an updated or new hand structure for the next iteration of the processes shown in FIG. 3. For example, block 314 may include initializing the updated or new hand structure with position and velocity values, so that the new hand structures inherit position and velocity values from the finger representations assigned thereto.

Figure 5:
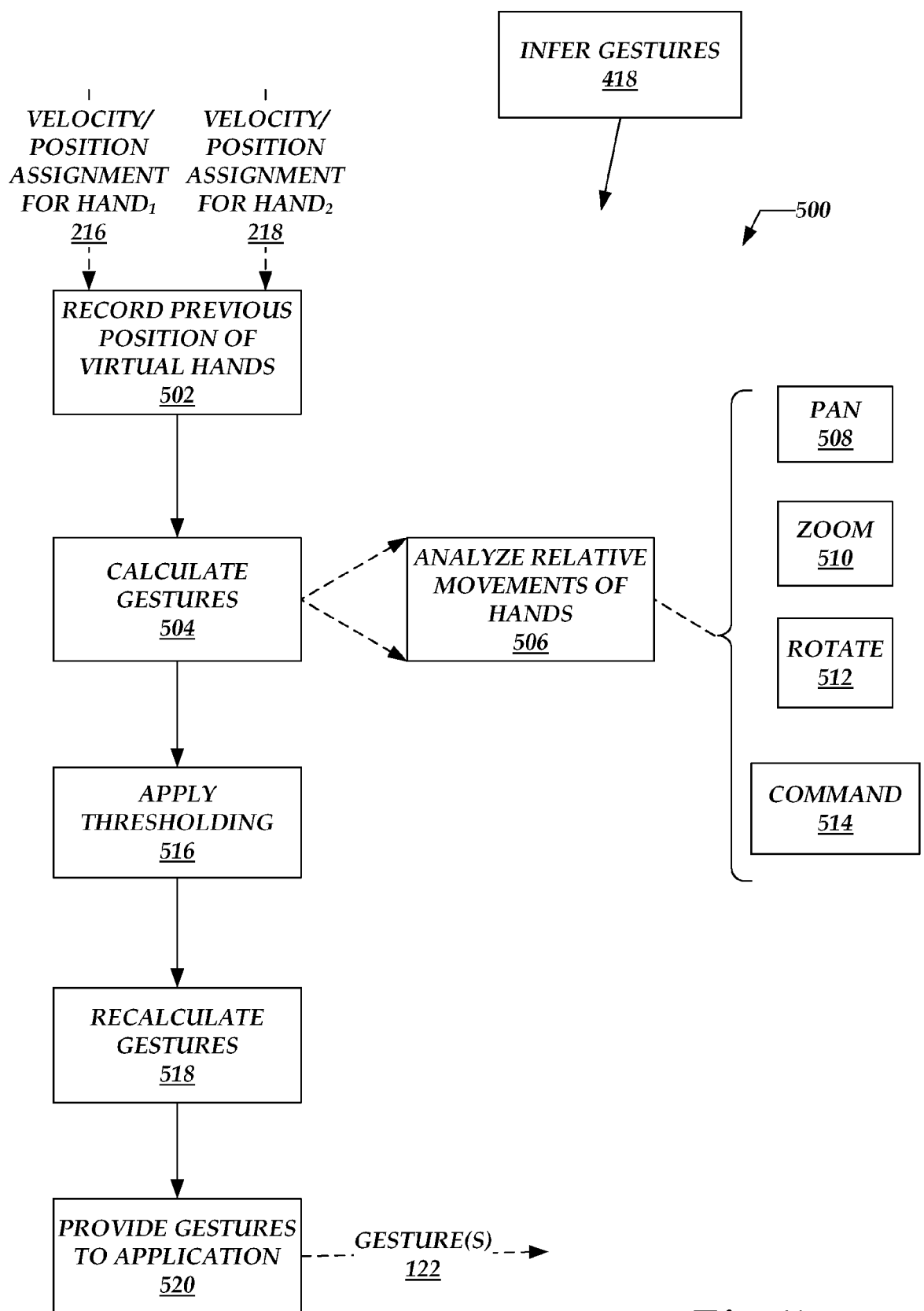
FIG. 5 is a flow chart of processes for inferring gestures based on the virtual hand grouping shown in FIGS. 3 and 4.

FIG. 5 illustrates process flows, denoted generally at 500, for inferring gestures, as introduced previously in FIG. 4 at 418. Turning to the process flows 500 in more detail, gesture inference or transformation may begin with block 502, which represents recording or storing previous positions of one or both of the virtual hands.

Block 504 represents calculating gestures as indicated by the velocity and/or position values assigned to the virtual hands 220 and 222. In turn, block 504 may also include comparing the previous positions of the virtual hands (as stored in block 502) with the present positions calculated for the virtual hand or hands. Although FIG. 5 illustrates a two-hand scenario, implementations of this description may also operate with one virtual hand or any number of virtual hands. Block 506 may also include projecting velocity parameters associated with the virtual hands onto a suitable reference frame, as described below in further detail with FIG. 6.

Projecting the velocity parameters onto a reference frame may enable the gesture inference process 418 to analyze relative movements of the hands, as represented by block 506. Block 506 may therefore include identifying one or more gestures associated with a given user action (e.g., 108 in FIG. 1). FIG. 5 illustrates non-limiting examples that include pan gestures 508, zoom gestures 510, rotate gestures 512, and any number of other command gestures 514.

Block 516 represents applying thresholding to the gestures identified in block 504. This thresholding may include tuning or filtering out gestures having minor magnitudes, because minor gestures may be inadvertent. Establishing the threshold applied in block 516 may involve trading off latency of response versus overall user experience. For example, if the threshold is set too small, users may become frustrated when minor movements trigger unintended gestures. However, if the threshold is set too large, users may become frustrated when larger movements failed to trigger intended gestures. However, the threshold applied in block 516 may readily be established through reasonable experimentation.

Block 518 represents recalculating the gestures projected or calculated in block 504, to account for the consequences of any thresholding applied in block 516. For example, after the thresholding operations in block 516, what may previously have appeared to be a gesture (e.g., zoom, pan, rotate, etc.) may be discarded as a relatively minor movement, and not output as a valid gesture.

Block 520 represents outputting any gestures projected and calculated by the process flows 500. Without limiting possible implementations, FIG. 5 carries forward from FIG. 1 examples of the gestures at 122.

Figure 6:
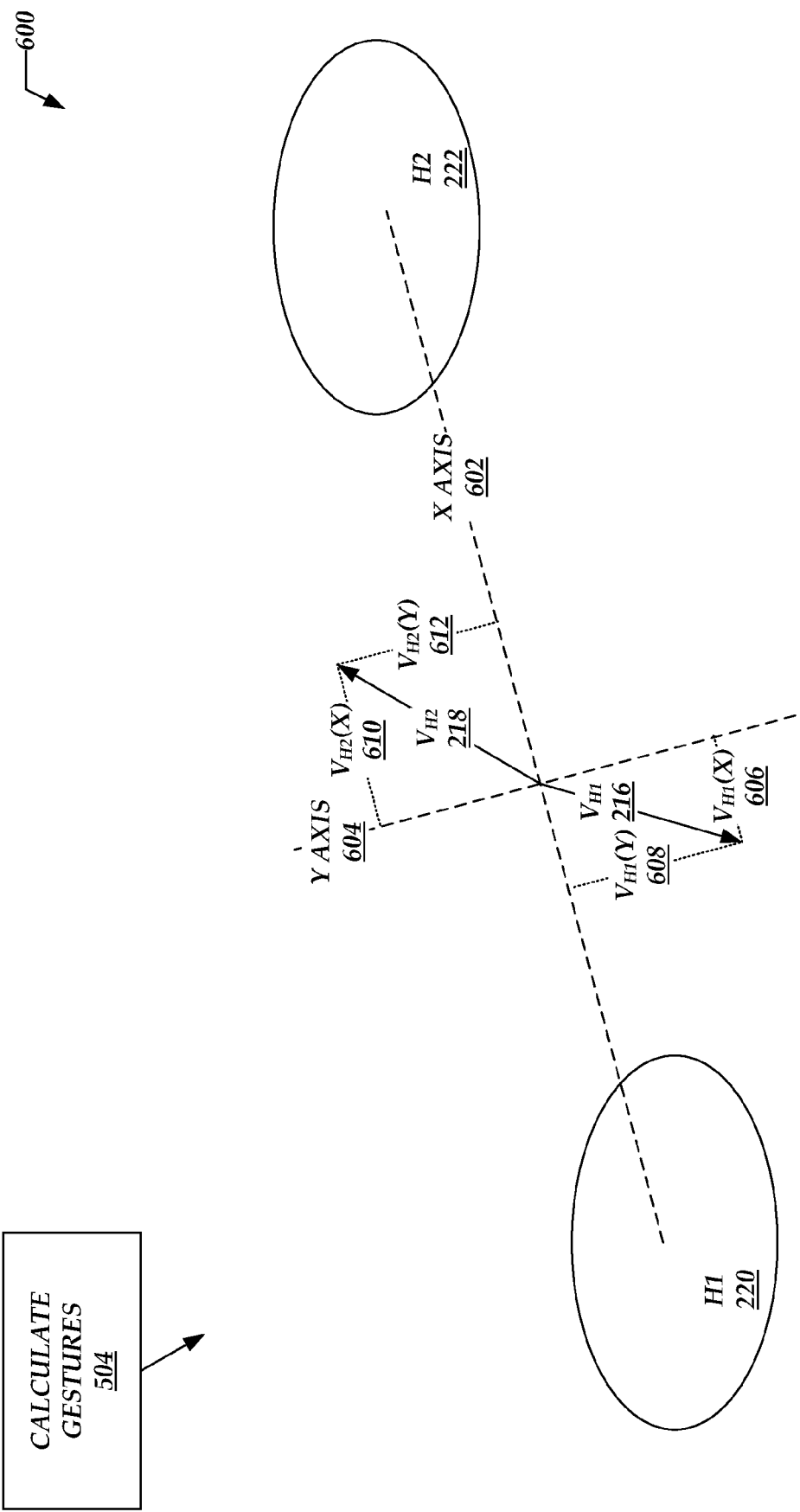
FIG. 6 is a block diagram illustrating reference frames that may be suitable for calculating or projecting gestures, as described above in FIG. 5.

FIG. 6 illustrates example reference frames, denoted generally at 600, that may be suitable for calculating or projecting gestures, as described above in FIG. 5. Without limiting possible implementations, the reference frames 600 may be understood as elaborating further on block 504 in FIG. 5. FIG. 6 also carries forward examples of virtual hand representations 220 and 222.

Turning to the reference frames 600 in more detail, the reference frames at 600 may include an X-axis 602 that connects the approximate center points of the calculated positions of the virtual hand representations 220 and 222. An example Y-axis 604 is perpendicular to the X-axis 602.

Recalling previous discussion, the virtual hand representations 220 and 222 are associated with calculated velocity parameters, with examples carried forward respectively at 216 and 218 (i.e., denoted as $V_{H1}$ and $V_{H2}$ in FIG. 6). Block 504 may include projecting these velocity parameters 216 and 218 onto the X-axis 602 and the Y-axis 604, to determine the X and Y components or weights of these velocity parameters along the axes 602 and 604. The weights or components of the velocity parameters 216 and 218 may indicate movement of the virtual and representations 220 and 222, relative to one another. In turn, this relative movement may indicate which gesture was intended by the user actions 108 represented by the virtual hands 220 and 222.

Turning to the velocity parameter 216 ($V_{H1}$), FIG. 6 denotes the X component of this velocity parameter at 606, and denotes the Y component of this velocity parameter at 608. Turning to the velocity parameter 218 ($V_{H2}$), FIG. 6 denotes the X component of this velocity parameter at 610, and denotes the Y component of this velocity parameter at 612.

In cases where the X components 606 and 608 indicate that the virtual hands 220 and 222 are both moving in approximately the same direction relative to the x-axis 602, the gesture calculation may infer that the user intends a pan gesture in that direction. In cases where the X components 606 and 608 indicate that the virtual hands 220 and 222 are moving approximately away from one another or approximately toward one another, the gesture calculation may infer that the user intends a zoom-out or zoom-in gesture, chosen as appropriate in different implementations. In cases where the Y components 608 and 612 indicate that the virtual hands 220 and 222 are rotating relative to one another, the gesture calculation may infer that the user intends a rotation gesture.

Generalizing the foregoing examples, the differential between the X components 206 and 210 may indicate a magnitude of any pan or zoom gestures, and the differential between the Y components 608 and 612 may indicate a magnitude of any rotate gestures. However, other examples of gestures are possible, with the foregoing examples provided only to illustrate possible, but not all, implementation scenarios.

The foregoing description provides technologies for contact grouping and gesture recognition for surface computing. Although this description incorporates language specific to computer structural features, methodological acts, and computer readable media, the scope of the appended claims is not necessarily limited to the specific features, acts, or media described herein. Rather, this description provides illustrative, rather than limiting, implementations. Moreover, these implementations may modify and change various aspects of this description without departing from the true spirit and scope of this description, which is set forth in the following claims.

We claim:

1. A computer-readable storage medium that is not a signal having stored thereon computer-executable instructions that, when loaded into at least one hardware processor and executed, cause the at least one hardware processor to:

receive at least one indication of a physical action directed by at least one user toward a surface computing system, wherein the physical action comprises a plurality of fingers of the at least one user being in physical contact with the surface computing system to interact with a software application program being presented on the surface computing system and, as a result, each of the plurality of fingers being interpreted by the surface computing system as a contact point of a plurality of contact points;

associate respective velocity parameters with the plurality of contact points;

calculate differentials between velocity parameters associated with pairs of the plurality contact points;

select a first contact point of the plurality of contact points and a second contact point of the plurality of contact points to identify a pair of contact points having a greatest differential in velocity and thereby separately identifying the first contact point as being associated with a first actual hand of the at least one user and the second contact point as being associated with a second actual hand of the at least one user, the first contact point having a first contact point velocity parameter and the second contact point having a second contact point velocity parameter;

associate the first contact point with a first virtual hand data structure that is representative of the first actual hand;

associate the second contact point with a second virtual hand data structure that is representative of the second actual hand;

assign the first contact point velocity parameter to the first virtual hand data structure;

assign the second contact point velocity parameter to the second virtual hand data structure;

associate a first remainder of the plurality of contact points with the first virtual hand data structure; and associate a second remainder of the plurality of contact points with the second virtual hand data structure.

2. The computer-readable storage medium of claim 1, wherein the plurality of fingers comprises different fingers on different hands.

3. The computer-readable storage medium of claim 1, wherein the instructions to associate respective velocity parameters include instructions to associate parameters that indicate a speed and direction associated with the physical action, with respect to the surface computing system.

4. The computer-readable storage medium of claim 1, wherein the instructions to associate a first remainder of the plurality of contact points include instructions to select one of the plurality of contact points other than the first and second contact points, further comprising instructions to calculate velocity differentials between the selected other one of the plurality of contact points and the first and second virtual hand data structures, and further comprising instructions to associate the selected other one of the plurality of contact points with the first virtual hand data structure or the second virtual hand data structure based upon with which of the first virtual hand data structure and the second virtual hand data structure the selected other one of the plurality of contact points has a smallest velocity differential and thereby identifying the selected other one of the plurality of contact points as being associated with the first actual hand of the at least one user or the second actual hand of the at least one user.

5. The computer-readable storage medium of claim 1, further comprising instructions to recalculate the velocity parameters associated with the first and second virtual hand data structures in response to associating the first and second remainders of the plurality of contact points with the first and second virtual hand data structures.

6. The computer-readable storage medium of claim 5, wherein the instructions to recalculate the velocity parameters of the first and second data structures include instructions to calculate a first virtual hand velocity parameter of the first virtual hand data structure by averaging the velocity parameters of the contact points assigned to the first virtual hand data structure, and include instructions to calculate a second virtual hand velocity parameter of the second virtual hand data structure by averaging the velocity parameters of the contact points assigned to second first data structure.

7. The computer-readable storage medium of claim 6, further comprising instructions to reassign the plurality of contact points to the first and second virtual hand data structures in response to recalculating the velocity parameters associated with the first and second virtual hand data structures.

8. The computer-readable storage medium of claim 7, wherein the instructions to reassign the plurality of contact points include instructions to calculate respective velocity differentials between the plurality of contact points and the first and second virtual hand data structures, and further comprising instructions to reassign the plurality of contact points to the first or second virtual hand data structures to minimize the velocity differential therebetween.

9. The computer-readable storage medium of claim 8, further comprising instructions to discard a contact point reassigned to the first virtual hand data structure, wherein the velocity parameter of the discarded contact point deviates a maximum value as compared to other contact points reassigned to the first virtual hand data structure, and further comprising instructions to discard a further contact point reassigned to the second virtual hand data structure, wherein the velocity parameter of the further discarded contact point deviates a maximum value as compared to other contact points reassigned to the second virtual hand data structure.

10. A surface computing system comprising:
at least one instance of processing hardware;
at least one bus system in communication with the processing hardware;
at least one computer-readable storage medium that is not a sign in communication with the processing hardware via the bus system, comprising storage having computer-executable instructions stored thereon that, when loaded into the processing hardware, transform the processing hardware to receive at least one indication of a physical action directed by at least one user toward the surface computing system, wherein the physical action is represented by a plurality of contact points that correspond to a plurality of fingers associated with the user;
associate respective velocity and position parameters with the plurality of contact points;
select two of the plurality of contact points having a maximum velocity differential therebetween;
associate a first one of the selected contact points with a first virtual hand data structure;
associate a second one of the selected contact points with a second virtual hand data structure;
assign the velocity and position parameters of the first selected contact point to the first virtual hand structure;
assign the velocity and position parameters of the second selected contact point to the second virtual hand structure; and
calculate a gesture represented by the physical action, based on relative movement between the first and second virtual hand structures as indicated by analysis of the first and second contact points.

11. The surface computing system of claim 10, wherein the instructions to calculate a gesture include instructions to infer that the physical action represents a pan command, zoom command, or rotate command issued by the user to the software application.

12. The surface computing system of claim 10, wherein the instructions to calculate a gesture include instructions to analyze movement represented in the first virtual hand data structure relative to movement represented in the second virtual hand data structure.

13. A computer-implemented method comprising performing computer-implemented operations for:
receiving at least one indication of a physical action directed by at least one user toward a surface computing system, wherein the physical action comprises a plurality of fingers of the at least one user being in physical contact with the surface computing system to interact with a software application program being presented on the surface computing system and, as a result, each of the plurality of fingers being interpreted by the surface computing system as a contact point of a plurality of contact points;
associating respective velocity parameters with the plurality of contact points;
calculating differentials between velocity parameters associated with pairs of the plurality contact points;
selecting a first contact point of the plurality of contact points and a second contact point of the plurality of contact points to identify a pair of contact points having a greatest differential in velocity and thereby separately identifying the first contact point as being associated with a first actual hand of the at least one user and the second contact point as being associated with a second actual hand of the at least one user, the first contact point having a first contact point velocity parameter and the second contact point having a second contact point velocity parameter;
associating the first contact point with a first virtual hand data structure that is representative of the first actual hand;
associating the second contact point with a second virtual hand data structure that is representative of the second actual hand;

assigning the first contact point velocity parameter to the first virtual hand data structure;

assigning the second contact point velocity parameter to the second virtual hand data structure;

associating a first remainder of the plurality of contact points with the first virtual hand data structure; and associating a second remainder of the plurality of contact points with the second virtual hand data structure.

14. The computer-implemented method of claim 13, wherein associating the respective velocity parameters with the plurality of contact points comprises associating parameters that indicate a speed and direction associated with the physical action, with respect to the surface computing system.

15. The computer-implemented method of claim 13, wherein associating the first remainder of the plurality of contact points with the first virtual hand data structure comprises selecting one of the plurality of contact points other than the first and second contact points, and further comprising:

calculating velocity differentials between the selected other one of the plurality of contact points and the first and second virtual hand data structures, and associating the selected other one of the plurality of contact points with the first virtual hand data structure or the second virtual hand data structure based upon with which of the first virtual hand data structure and the second virtual hand data structure the selected other one of the plurality of contact points has a smallest velocity differential and thereby identifying the selected other one of the plurality of contact points as being associated with the first actual hand of the at least one user or the second actual hand of the at least one user.

16. The computer-implemented method of claim 13, further comprising recalculating the velocity parameters associated with the first and second virtual hand data structures in response to associating the first and second remainders of the plurality of contact points with the first and second virtual hand data structures.

17. The computer-implemented method of claim 16, wherein recalculating the velocity parameters associated with the first and second virtual hand data structures comprises calculating a first virtual hand velocity parameter of the first virtual hand data structure by averaging the velocity parameters of the contact points assigned to the first virtual hand data structure, and calculating a second virtual hand velocity parameter of the second virtual hand data structure by averaging the velocity parameters of the contact points assigned to second first data structure.

18. The computer-implemented method of claim 17, further comprising reassigning the plurality of contact points to the first and second virtual hand data structures in response to recalculating the velocity parameters associated with the first and second virtual hand data structures.

19. The computer-implemented method of claim 18, wherein reassigning the plurality of contact points to the first and second virtual hand data structures comprises calculating respective velocity differentials between the plurality of contact points and the first and second virtual hand data structures, and reassigning the plurality of contact points to the first or second virtual hand data structures to minimize the velocity differential therebetween.

20. The computer-implemented method of claim 19, further comprising:

discarding a contact point reassigned to the first virtual hand data structure, wherein the velocity parameter of the discarded contact point deviates a maximum value as compared to other contact points reassigned to the first virtual hand data structure; and discarding a further contact point reassigned to the second virtual hand data structure, wherein the velocity parameter of the further discarded contact point deviates a maximum value as compared to other contact points reassigned to the second virtual hand data structure.

* * * * *